United States Patent [19]

Luise

[11] 4,183,895
[45] Jan. 15, 1980

[54] PROCESS FOR TREATING ANISOTROPIC MELT-FORMING POLYMERIC PRODUCTS

[75] Inventor: Robert R. Luise, Wilmington, Del.

[73] Assignee: E. I. Du Pont de Nemours and Company, Wilmington, Del.

[21] Appl. No.: 858,025

[22] Filed: Dec. 6, 1977

Related U.S. Application Data

[63] Continuation of Ser. No. 625,133, Oct. 23, 1975, abandoned.

[30] Foreign Application Priority Data

Apr. 29, 1975 [SE] Sweden .............................. 7504996
May 5, 1975 [SE] Sweden .............................. 7505189

[51] Int. Cl.² .............................................. B29C 25/00
[52] U.S. Cl. ................................ 264/345; 264/176 F; 264/176 R; 264/342 RE; 264/347; 528/191; 528/309
[58] Field of Search .......... 264/176 R, 176 F, 210 F, 264/234-236, 345-346, 342 RE, 347; 260/47 C, 75 T, 75 R; 528/191, 309

[56] References Cited

U.S. PATENT DOCUMENTS

| | | | |
|---|---|---|---|
| 3,030,173 | 4/1962 | Kurzke et al. | 264/342 RE |
| 3,036,990 | 5/1962 | Kantor et al. | 260/47 C |
| 3,374,202 | 3/1968 | Schwarz | 260/75 R |
| 3,400,194 | 9/1968 | Boone et al. | 264/210 F |
| 3,671,542 | 6/1972 | Kwolek | 260/30.8 R |
| 3,673,143 | 6/1972 | Bair et al. | 260/78 S |
| 3,778,410 | 12/1973 | Kuhfuss et al. | 260/47 C |
| 3,804,805 | 4/1974 | Kuhfuss et al. | 260/47 C |
| 3,819,587 | 6/1974 | Kwolek | 260/47 C |
| 3,827,998 | 8/1974 | Morgan | 260/30.8 R |
| 3,888,965 | 6/1975 | Kwolek | 260/47 C |
| 3,975,487 | 8/1976 | Cottis et al. | 264/210 F |
| 4,048,148 | 9/1977 | Morgan | 264/346 |
| 4,075,262 | 2/1978 | Schaefgen | 528/191 |
| 4,118,372 | 10/1978 | Schaefgen | 528/191 |

Primary Examiner—Jeffery R. Thurlow

[57] ABSTRACT

Fibers with enhanced tenacity are prepared by heat treating oriented fibers from anisotropic-melt-forming linear aromatic and cycloaliphatic polymers, especially polyesters (including copolyesters), while said fibers are essentially relaxed, at temperatures near the flow temperature but sufficiently below to prevent substantial interfilament fusion, for a period of from five seconds to several hours until the fiber tenacity is increased by at least 50% and to at least 10 grams per denier.

12 Claims, 1 Drawing Figure

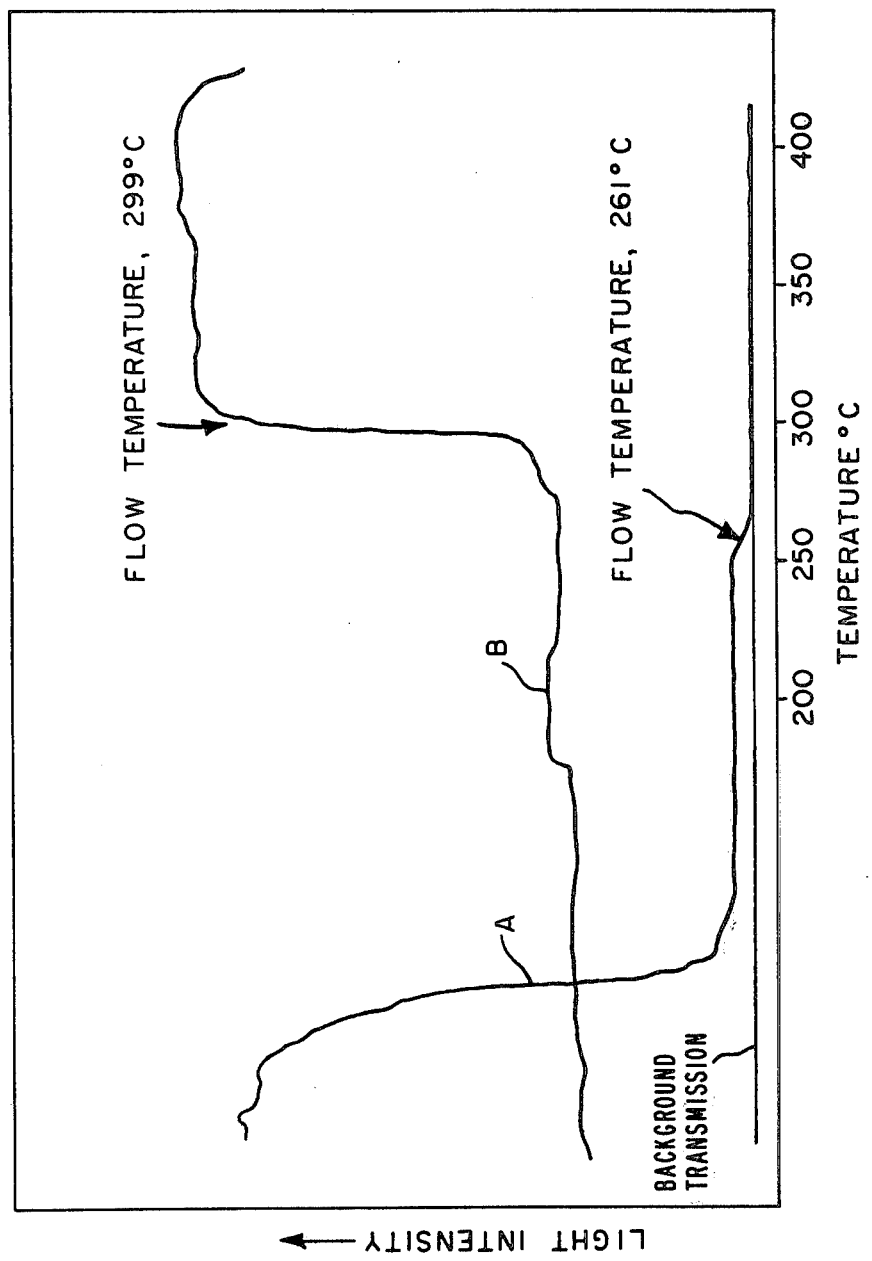

PROCESS FOR TREATING ANISOTROPIC MELT-FORMING POLYMERIC PRODUCTS

CROSS-REFERENCE TO RELATED APPLICATION

This application is a continuation of my application Ser. No. 625,133 filed Oct. 23, 1975 now abandoned.

BACKGROUND OF THE INVENTION

The almost universally used method for increasing the strength of as-spun synthetic fibers to a significant degree, at least 50%, has been by drawing. For example, strong fibers of polyethylene terephthalate are obtained by extensively drawing the as-spun fiber, e.g., as shown by Boone, et al., U.S. Pat. No. 3,400,194. A technique for increasing the strength of fibers which does not involve drawing is a worthwhile objective.

SUMMARY OF THE INVENTION

This invention provides strengthened fibers by the process of heat treating oriented fibers from certain anisotropic-melt-forming polymers, especially polyesters and copolyesters. The fibers are heat-treated while essentially relaxed for a time (from about 5 seconds to several hours) sufficient to increase the tenacity of the fibers by at least 50% and to at least 10 grams per denier. The heat treatment causes further polymerization of the polymer of the fiber as shown by an increase in inherent viscosity or by loss of solubility.

The fibers to be treated are oriented. Useful polymers for such fibers form optically anisotropic melts which can be spun directly into fibers that are oriented "as-spun". No drawing is required to achieve orientation and, in fact, these fibers cannot be drawn or extended in the usual sense, i.e., 100% or more. The fibers are heat treated while essentially relaxed, e.g., in a skein, as a loose package or on a bobbin. By "essentially relaxed" is meant free of such tension as would cause breakage of the fiber during heat treatment. At least part of the heat treatment of the polyester fibers is conducted at temperatures of at least 200° C. (preferably at least 250° C.) for 1 minute to several hours, preferably ½ to 4 hours. Preferably the heat treatment is carried out at a temperature close to, e.g., within 20° C. of, but below the fiber flow temperature to prevent substantial interfilament fusion. The resulting fibers have enhanced tenacity, frequently several times the tenacity of the as-spun fibers and frequently have increased modulus as well.

DRAWING

The FIGURE is a schematic of background transmission and intensity traces determined on two polymers as described hereinafter.

DETAILED DESCRIPTION

Precursor Fiber

The oriented fibers that are heat treated according to this invention are obtained from anisotropic-melt-forming linear polymers which yield oriented fibers as they are spun by conventional melt-spinning techniques. Preferably, they are extruded from anisotropic melts of such polymers. By "anisotropic-melt-forming" polymers is meant those which form anisotropic melts according to the thermooptical test (TOT) described below. The polymer of the fiber must be capable of further polymerization as shown by an increase in inherent viscosity upon heat treatment.

As used herein, an "as-spun" fiber is one which has not been drawn, stretched, or heat treated after extrusion and normal windup. An "oriented" fiber is one which has an X-ray orientation angle (O.A.) of less than 65°.

Anisotropic-melt-forming Polymers

Useful anisotropic-melt-forming polymers should have a flow temperature preferably in excess of 200° C. and should be linear condensation polymers in which the radicals that are attached to the in-chain functional groups (which are formed in the condensation process, e.g., carbonyloxy groups) are selected from the group of (1) single and fused 6-membered carbocyclic ring systems for example, naphthylene, and the like, wherein the chain-extending bonds of the ring system, if attached to the same ring, are positioned 1,4- to each other, and if attached to different rings, are in positions parallel and oppositely directed, and (2) multiple 6-membered carbocyclic ring systems preferably containing two or three rings in which the chain-extending bonds of each ring are in the 1,4-positions and in which the individual rings are joined by a chemical bond or a divalent radical containing no more than 4 acyclic in-chain atoms such as C, O or S and the like. Intended in the foregoing are also radicals which are substituted with, for example, chlorine, bromine, fluorine or lower alkyl (1-4 carbon atoms).

The polymers that are useful in this invention should melt at temperatures low enough for melt extrusion without substantial degradation, i.e., below about 375° C. The polymers must also be capable of being spun from the melt into as-spun oriented fibers. The polymer of the fiber must have end groups, e.g., —CHO, —NH₂, —OH, —COOH, or functional derivatives thereof which permit further polymerization upon heat treatment.

The radicals that are attached to the in-chain functional groups and which conform to the aforementioned group (1) and (2) radicals, may be replaced in part by nonconforming radicals providing the latter do not interfere with the anisotropic-melt-forming capability of the polymer or the ability of fibers formed from such polymers to increase at least 50% in tenacity to at least 10 grams per denier upon heat treatment.

Anisotropic-melt-forming (co)polyesters that are preferred for use in this invention consist essentially of recurring structural units selected from the group

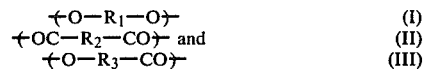

$$\text{\textopenbullet O—R}_1\text{—O\textcloseepsilon} \quad \text{(I)}$$
$$\text{\textopenbullet OC—R}_2\text{—CO\textcloseepsilon} \text{ and} \quad \text{(II)}$$
$$\text{\textopenbullet O—R}_3\text{—CO\textcloseepsilon} \quad \text{(III)}$$

wherein units I and II, if present, are present in substantially equimolar amounts: $R_1$, $R_2$ and $R_3$ are radicals selected from the group of (1) single and fused six-membered aromatic carbocyclic ring systems wherein the chain extending bonds of the ring system, if attached to the same ring, are positioned 1,4- to each other, and if attached to different rings, are in positions parallel and oppositely directed, and (2) multiple six-membered aromatic carbocyclic ring systems in which the chain-extending bonds of each ring are in the 1,4-positions and in which the individual rings are joined by a chemical bond or a divalent radical containing no more than 4 acyclic in-chain atoms; $R_2$ may also be

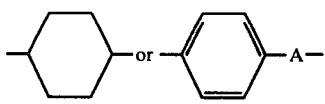

wherein A is a divalent radical containing one or two acyclic in-chain atoms. Preferred group (1) radicals are phenylene and naphthylene while preferred group (2) radicals contain two phenylene rings. Of such (co)polyesters, most preferred are those consisting essentially of units I and II. The (co)polyesters, as mentioned above, may comprise units I and II in substantially equimolar amounts or may comprise a combination of units I, II, and III and, of course, more than one kind of each unit I, II and/or III can be present in the polymer.

Prime examples of polymers that are amenable to the process of the invention are the following: polymers which consist essentially of the recurring units

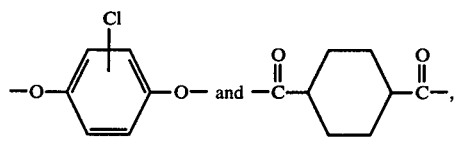

and polymers which consist essentially of the recurring units

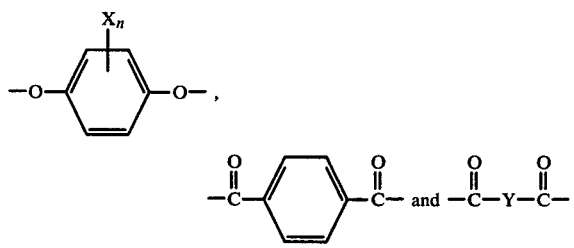

wherein X is selected from the group of chloro and methyl; n is 1 or 2; Y is selected from the group of 4,4'-biphenylene and 2,6-naphthylene; and the ratio of

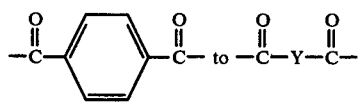

units is within the range of 4:1 to 1:4.

Also included among suitable anisotropic-melt-forming (co)polyesters are those wherein some of the I, II or III units may be replaced with aromatic polymer-forming units (i.e., units wherein the chain extending functional groups are attached to aromatic rings) not conforming to those described above and which do not interfere with the anisotropic melt-forming capability of the polymers. The nonconforming units in the polymer may constitute up to 30 mol %, preferably up to 5 mol %, based on the total I, II and III units and their replacement units. Where formula I and/or II units are replaced, the formula I units and their replacements are present in substantially equimolar amounts with the formula II units and their replacements.

The (co)polyesters are prepared preferably by melt polycondensation of dihydric phenols or suitable derivatives thereof and aromatic-aliphatic, aromatic and cycloaliphatic dicarboxylic acids or their derivatives. A convenient preparative method is the melt polycondensation of the diacetate of a dihydric phenol with a dicarboxylic acid. Alternatively, phenolic carboxylic acids or their derivatives may be used as coreactants in the preparation of polyesters and copolyesters.

A nonlimiting list of useful dihydric phenols preferably in the form of their diacetate derivatives includes hydroquinone, chlorohydroquinone, bromohydroquinone, methylhydroquinone, dimethylhydroquinone, dichlorohydroquinone, dibromohydroquinone, 4,4'-oxydiphenol, 4,4'-isopropylidenediphenol, 4,4'-thiodiphenol, 4,4'-biphenol, 3,5,3',5'-tetramethyl-4,4'-biphenol, 3,5,3',5'-tetrachloro-4,4'-biphenol, 2,6-dihydroxynaphthalene, 2,7-dihydroxynaphthalene, and 4,4'-methylenediphenol and the like.

A nonlimiting list of useful dicarboxylic acids includes terephthalic acid, 4,4'-bibenzoic acid, 4,4'-oxydibenzoic acid, 4,4'-thiodibenzoic acid, 4-carboxyphenoxyacetic acid, 4,4'-trans-stilbenedicarboxylic acid, 2,6-naphthalenedicarboxylic acid, ethylenedioxy-4,4'-dibenzoic acid, isophthalic acid, the halogen and methyl substituted derivatives of the foregoing dicarboxylic acids, 1,4-trans-cyclohexanedicarboxylic acid, 2,5-dimethyl-1,4-trans-cyclohexanedicarboxylic acid, and the like.

A nonlimiting list of phenolic carboxylic acids includes 4-hydroxybenzoic acid, 4-(4'-hydroxyphenoxy)-benzoic acid and the like.

It is to be understood that while (co)polyesters useful in this invention can be prepared from all the ingredients cited above, not all combinations of ingredients yield polymeric species that are useful for preparing the precursor fiber. For example, the polyester from hydroquinone and terephthalic acid decomposes prior to melting. The polyester prepared from chlorohydroquinone and isophthalic acid does not form an anisotropic melt and a fiber thereof is not strengthened by the process of this invention. Fibers formed from anisotropic melt forming polymers selected from the group of polythiolesters, polycarbonates and polyazomethines have also been strengthened by the process of the present invention.

Polymerization Conditions

The (co)polyesters are preferably prepared from appropriate monomers by melt polymerization techniques under anhydrous conditions in an inert atmosphere. For example, equimolar amounts of the reactant diacid and the diacetate of the dihydric phenol are combined in a reaction vessel equipped with a stirrer, nitrogen inlet tube, and combined distillation head-condenser (to facilitate by-product removal). The reaction vessel and other equipment are dried and purged with nitrogen prior to use. The vessel and stirred contents, maintained under nitrogen, are heated during which time the reactants polymerize and the by-product (acetic acid) is removed via the distillation head-condenser and is collected. When the polymerization appears nearly complete, as indicated by the amount of acetic acid collected remaining constant, the molten polymer mass is placed under reduced pressure (e.g., 1 mm. Hg or less) and is heated at a higher temperature to facilitate removal of the remaining acetic acid and to complete the polymerization. The melt may then be removed, cooled, and allowed to solidify prior to purification and/or subsequent processing. Optionally, the molten polymer may be transferred directly to a fiber spinning unit.

Polymerization conditions may be varied according to, e.g., the reactants employed and the degree of polymerization desired. The melt should be sufficiently stable to allow extrusion without decomposition, especially without formation of gaseous products. Molecular weight attained should be sufficient for the product to exhibit fiber-forming properties. Too high a molecular weight leads to extrusion problems due to high melt viscosity.

Anisotropic Melts

The anisotropy of these polymers in the molten state appears to facilitate attainment of high orientation, strength and/or initial modulus in the fibers as they are extruded by conventional techniques.

It is well known that translucent optically anisotropic materials cause light to be transmitted in optical systems equipped with crossed polarizers [see, e.g., S. A. Jabarin and R. S. Stein, J. Phys. Chem. 77, 399 (1973)], whereas transmission of light is theoretically zero for isotropic materials. Thus, optical anisotropy can be determined by placing a sample of the polymer on a heating stage of a polarizing microscope and bringing the temperature up to and beyond the polymer flow temperature. If the polymer is optically anisotropic in the melt, a bright field will be observed at temperatures above the polymer flow temperature. This may be confirmed through use of the thermo-optical test (TOT) described below. The apparatus is similar to that described by I. Kirshenbaum, R. B. Isaacson, and W. C. Feist, Polymer Letters, 2, 897–901 (1964).

Production of Fibers

The polymers are formed into fibers by spinning the anisotropic melts thereof. Especially preferred are the highly oriented, strong fibers. For fiber preparation the molten polymer mass, obtained either directly from the melt polymerization of the (co)polymer-forming ingredients or via the melting of a plug or block of (co)polymer, is processed, e.g., through a melt spinning unit and extruded through a spinneret into a quenching atmosphere (e.g., air maintained at room temperature) and wound up.

Fibers may be prepared conveniently from single or multi-hole spinnerets. In the melt spinning cell, the temperatures to be maintained in the melt zone and at the spinneret will vary, of course, depending on the polymer being spun. Filtering screens and discs may be employed in the spinneret pack. Air or nitrogen may be used as a quenching medium for the fibers leaving the spinneret. The as-spun fibers may be wound up at varying speeds, e.g., from less than 100 yd/min. to 1,750 yd/min. or higher. Spin stretch factor (SSF, defined hereinafter) varies with spinneret hole size and may range from 5 to 400. If desired, a finish may be applied to the as-sun fibers.

HEAT TREATEMENT OF FIBERS, UTILITY

The fibers that are heat-treatable by the process of this invention are oriented as shown by their wide angle diffraction patterns (values of their orientation angles being less than about 65°) and are characterized by a tenacity of at least 1, preferably at least 2 gpd. Heat treatment of such fibers in accordance with this invention increases their tenacity by at least 50% to at least 10 grams per denier. Fiber heat treatment may be carried out under a variety of time and temperature conditions as hereinafter exemplified. It is most preferred for best tenacity response that part of the heat treatment be close to, but below, the flow temperature.

The heat treatment generally proceeds more expeditiously as the temperature increases within the desired range, it being usually desired not to operate at a temperature so high that it is impractical to rewind the yarn because of fusion between the filaments. Problems may arise at slightly lower temperatures because of sticking of the filaments, but it is possible to operate at such temperatures if the filaments are precoated with a thin layer of an inert substance, e.g., finely divided talc, graphite or alumina, and useful results have been obtained by operating in this way.

Heat treating temperatures from 200° C. or even lower, to 350° C. or higher, preferably from 250° to 330° C., have been found useful.

Many heat strengthened fibers prepared by the process of this invention exhibit a tenacity of greater than 10 gpd, an elongation of greater than about 2%, and an initial modulus greater than 200 gpd. These properties favor the use of these fibers in, e.g., belts of automobile tires, towing ropes, plastic reinforcement, knitted and woven fabrics, and other applications wherein a combination of high strength, low extensibility, low density, and high initial modulus are required, e.g., in the preparation of ropes, hawsers, and cordage for marine usage as noted in U.S. Pat. No. 3,400,194.

In the heat treating process, oriented fibers are treated essentially relaxed or under a slight tension limited by the strength of the fibers under the time-temperature conditions used. For fibers, skeins, loose packages, staple fiber or bobbins of yarn are suitable. Use of bobbins for filament yarns is preferred for practical reasons. Yarns should not be tightly pressed against each other under treatment conditions. There is no advantage in heating under tension since it does not produce any significant increase in tenacity over that obtained by relaxed heat treatment and is more likely to result in fiber breakage.

Heat treatment of the filaments may be conducted in an inert atmosphere (e.g., in nitrogen or in vacuo) in a heating device such as an oven, muffle or tube furnace. When the fiber samples are wound on bobbins, it is preferred that a soft, heat-resistant surface that yields at very low stresses be present on the bobbin, e.g., a covering of "Fiberfrax" (batted ceramic insulation of the Carborundum Company). The inert atmosphere within the oven or other heat-treating chamber is continuously purged during the treating period by a flow of inert gas (e.g., nitrogen) through the oven sufficiently fast to remove by-products from the vicinity of the fiber. The process can be carried out under reduced pressure.

For practical purposes, heating will be carried out for as short a period as possible consistent with obtaining increased tenacity. Depending on the polymer heating periods from as little as 5 seconds, generally at least $\frac{1}{2}$ hour to 24 hours or longer, have been used. In general, the use of lower temperatures requires longer times to reach a given tenacity level than use of higher temperatures.

The temperatures employed for heat treating the oriented fiber must, at least initially, be below the flow temperatures thereof to avoid substantial interfilament fusion or melting. Preferably, the heating is carried out at temperatures close to but below such flow temperatures. As the fiber is heated, its flow temperature ordinarily increases somewhat, thus permitting still higher temperatures of heat treatment without melting of the fiber and without substantial fusion between filaments. In essence a new fiber flow temperature (determinable as described herein) has been attained and heating is taking place below such temperature. It is generally desired to operate at the highest temperature permissible which does not cause melting or fusion and is consistent with avoiding undue polymer degradation.

In a continuously adjusted process the temperature of the atmosphere surrounding the fiber is increased slowly at a regular rate of about 3° C./min or less, depending on the particular fiber species being treated, up to a temperature as close to the flow temperature as possible but short of the point at which substantial interfilament fusion occurs. The fiber is then removed or allowed to cool before being removed from the heating device. In a multistep process, the fiber is subjected to a series of stepwise temperature increases (exposure times and temperatures may vary with fiber species) from an initial temperature (room temperature or higher) with the fibers being exposed for a period of time at each step. Heat treating just below the flow temperature (within about 20° C.) for at least part of the time is most preferred. In a single temperature process, the fiber is preferably heated only at the highest possible temperature short of substantial interfilament fusion. Heating short of the maximum permissible temperature may produce smaller gains in fiber tensile properties. Modifications of the above can also be employed.

Heat treatment of the fibers in accordance with the present invention increases their tenacity. The increase in tenacity is accomplished by an increase in molecular weight, and often by an increase in orientation. Therefore, it is important to perform the heat treatment on polymer which is capable of further polymerization. The presence of end groups which permit further reaction, e.g., carboxyl and hydroxyl groups or their functional equivalents, is necessary for further polymerization. The increase in molecular weight is shown by an increase in inherent viscosity as determined on the fiber before and after heat treatment. At times, the increase in molecular weight is such that the heat treated fiber is insoluble in the solvent used to determine the inherent viscosity of the fiber prior to heat treatment. End-capping can adversely affect ability to further polymerize and hence may interfere with the heat treating process unless of course the end-capper is readily driven off in the treatment. One other aspect of the process is that the polymer of the oriented fiber must possess the correct combination of flexibility and stiffness in the molecular chain such that the polymer forms an anisotropic melt from which oriented fibers can be spun directly and which on heating, maintain or increase the overall order and orientation.

The improvement in the properties of the fibers under the conditions of heat treatment is quite different from a heat setting, or annealing treatment which has been conventional for previous melt spun filaments, such as nylon or poly(ethylene terephthalate) for the purpose of removing stresses in the filaments. Indeed, it was extremely surprising that such heat treatment could cause such a significant improvement in these desirable properties of the filaments spun from such anisotropic melts.

In contrast to the process of the present invention, the heat treatment of drawn or undrawn poly(ethylene terephthalate) fibers, both essentially relaxed, produces fibers of lowered tenacity.

Attempts to heat strengthen undrawn fibers of poly(2-chloro-1,4-phenylene isophthalate), (an aromatic polyester that does not form an anisotropic melt) resulted in the production of a weak fiber.

MEASUREMENTS AND TESTS

X-ray Orientation Angle

The orientation angle (O.A.) values herein are obtained by the procedures described in Kwolek U.S. Pat. No. 3,671,542, using Method Two of that patent. Shown parenthetically after each O.A. value in the examples is the position, $2\theta$ (degrees), of the specific arc used to determine the O.A. value.

Inherent Viscosity

Inherent viscosity ($\eta_{inh}$) is determined by the procedure shown in Morgan U.S. Pat. No. 3,827,998, using these solvent systems: a mixture of trifluoroacetic acid/methylene chloride (30/70, V/V, Method 1); 1,3-dichloro-1,1,3,3-tetrafluoroacetone hydrate (Method 2); a mixture of trifluoroacetic acid/methylene chloride/1,3-dichloro-1,1,3,3-tetrafluoroacetone hydrate/1,1,2,2-tetrachloroethylene/p-chlorophenol (7.5/17.5/12.5/12.5/50 by volume, Method 3); a mixture of trifluoroacetic acid/methylene chloride/1,3-dichloro-1,1,3,3-tetrafluoroacetone hydrate/1,1,2,2-tetrachloroethylene (15/35/25/25 by volume, Method 4).

For determining ($\eta_{inh}$) for polyazomethines, the solvent is concentrated sulfuric acid (98% $H_2SO_4$). The polymer sample (or fiber), 98% sulfuric acid, and an equal volume of 3 mm. Teflon® cubes, are combined in a closed bottle and placed on a shaking machine for the minimum time to form a solution, usually 10 to 25 minutes. A Cannon-Fenske viscometer is filled by inversion technique and placed in a constant temperature bath consisting of a saturated water solution of potassium dichromate. Three consecutive flow times are measured immediately. The shaking operation is conducted in the dark and all transfer steps are done quickly in subdued light. If solution flow time decreases with successive measurements, the longest time is used for the calculation of $\eta_{inh}$.

Fiber Tensile Properties

Filament and yarn properties are measured by the procedures shown in Morgan U.S. Pat. No. 3,827,998 with fibers being conditioned at least one hour before testing. Tenacity, T, and Modulus, Mi, are given in grams per denier. Elongation, E, is given in percent. At least three breaks are averaged.

It should be noted that different values are obtained from single filaments (filament properties) and from multifilament strands (yarn properties) of the same sample. Unless specified otherwise all properties given herein are filament properties.

Optical Anisotropy

Optical anisotropy may be measured by the TOT method described herein.

Spin Stretch Factor

The spin stretch factor (SSF) is defined as follows:

$$SSF = \frac{\text{Velocity of yarn at wind-up (ft./min.)}}{\text{Velocity of melt through spinneret (ft./min.)}}$$

where

-continued $$\text{Vel. of melt through spinneret} = \frac{\text{Rate of extrusion (cu. ft./min.)}}{\text{Cross-sectional area of one hole (sq. ft.)}}$$

TOT AND FLOW TEMPERATURE APPARATUS AND METHOD

The thermo-optical test (TOT) requires a polarizing microscope which should have strain-free optics and sufficiently high extinction with crossed (90°) polarizers to be capable of giving a background transmission specified below. A Leitz Dialux-Pol microscope was used for the determinations reported herein. It was equipped with Polaroid polarizers, binocular eyepieces, and a heating stage. A photodetector (a photometer sensor) was attached at the top of the microscope barrel. The microscope had a 32X, long working distance objective, and a Red I (a first order Red) plate (used only when making visual observations with crossed polarizers; inserted at an angle of 45° to each polarizer). White light from an incandescent light source is directed through the polarizer, through the sample on the heating stage and through the analyzer to either the photodetector or the eyepieces. A slider permits transferring the image from eyepieces to photodetector. The heating stage used is one capable of being heated to 500° C. A "Unitron" model MHS vacuum heating stage (Unitron Instrument Co., 66 Needham St., Newton Highlands, Mass. 02161) was used. The photodetector signal is amplified by a photometer amplifier and fed to the Y-axis of an X-Y recorder. The system response to light intensity should be linear and the precision of measurement within ±1 mm. on the chart paper. The heating stage is provided with two attached thermocouples. One is connected to the X-axis of the X-Y recorder to record stage temperature, the other to a programmed temperature controller.

The microscope is focused visually (with crossed polarizers) on a polymer sample prepared and mounted as described below. The sample, but not the cover slip(s), is removed from the optical path. The Polaroid analyzer of the microscope is removed from the optical path, the slider is shifted to transfer the image to the photodetector and the system is adjusted so that full-scale deflection (18 cm on the chart paper used) on the Y-axis of the X-Y recorder corresponds to 36% of the photometer signal. This is done by (1) adjusting the light source intensity so that the photometer meter reads a value preselected so that it corresponds to a Y-axis reading on the recorder of 5 cm; (2) increasing the amplification of the photometer by a factor of 10. This results in the full scale recorder deflection of 18 cm corresponding to (18/50)×100 or 36% of the photometer signal. The background transmission value is recorded with crossed (90°) polarizers and with the cover slip(s), but not the sample, in the optical path. The background transmission in the system used should be independent of temperature and should be less than about 0.5 cm on the chart paper. The sample film (see below) then is positioned so that essentially all the light intercepted by the photodetector will pass through the sample. With the sample between crossed (90°) polarizers and under nitrogen, the light intensity and temperature are recorded on the X-Y recorder as the temperature is raised at a programmed rate of about 14° C./min. from 25° to 450° C. With polyazomethines and other polymers that can rapidly polymerize on heating the rate of heating is about 50° C./min. and the upper limit 465° C. The sample temperature is obtained from the recorded temperature by use of a suitable calibration curve.

The sample is a polymer film (made by pressing, or by cutting a section) preferably about 5 μm (micrometers) thick. Films that are too thick or too thin may fail to exhibit anisotropy by this test. However, if a good quality pressed film as prepared below does exhibit anisotropy by this TOT procedure, there is no need to repeat the test on a film that is about 5 μm thick. At times, microtomed films of about 2 μm in thickness were employed because uniform films of about 5 μm thickness were not available.

In most instances, and this is the preferred technique, polyester samples about 5 μm thick are prepared for TOT by microtoming (with a diamond knife) a solid well-coalesced chip of pure polymer mounted in epoxy resin and a polymer particle is used for flow temperature (see below) determination. The microtomed film is pressed flat between cover slips; one cover slip is removed and the film on the remaining cover slip is placed (glass down) on the heating stage for TOT measurement. For materials that shatter or do not produce a good quality film when microtomed and in the case of polyazomethines, duplicate films (about 5 μm thick) of polymer are prepared by heating a few particles of pure polymer between each of two sets of cover slips enclosed between a pair of microscope slides. By heating this assembly quickly above the flow temperature (independently determined approximately on a polymer particle) and applying pressure with a wooden tamp over each sample, thin liquid films of polymer are produced. These films solidify when cooled. One solid film between cover slips is used for the TOT procedure; the other is used directly (without cutting) for a flow temperature measurement. Since the polyazomethine samples may readily polymerize further during this procedure, it is important that heating time and temperature in the sample preparation for these polymers be kept to a minimum. Thickness of such pressed films may be estimated interferometrically. This is done conveniently indirectly by infiltrating an oil of known refractive index between the cover slips enclosing the sample and measuring the thickness of the oil layer at an interface with air in the region adjacent to the portion of sample to be observed in the TOT procedure. After the thickness is determined, the oil is readily removed by a short immersion in Freon ® TF solvent which is agitated ultrasonically.

To make certain that reliable results are obtained in the TOT procedure, it is important that films to be examined are of good quality. Film samples containing non-melting materials, or those with cracks, voids or bubbles are to be avoided. For example, expansion of voids or bubbles, especially in pressed films, may introduce anisotropy due to a shearing effect and thus cloud the results that are obtained. At the borderline composition range between polyesters showing static melt anisotropy (those useful in this invention) and those exhibiting only shear anisotropy, special care should be taken to eliminate readings due to shear anisotropy unintentionally introduced during pressed film formation. Microtomed films should be used or, if unavailable, pressed films should be maintained above the flow temperature long enough to dissipate the effects of shear anisotropy. Thereafter the TOT procedure may be carried out in the usual way.

The flow temperature of (co)polymers or fibers is observed visually between crossed (90°) polarizers on the heating stage assembly previously described for the TOT procedure. Cut fiber samples for examination are prepared by cutting the fiber with a razor blade and mounting the samples on a cover slip. Flow temperature is that temperature at which the sharp edges of the chip or polymer particle or the cut fiber edge become rounded, or at which the film edges of the duplicate pressed film change contour. This subtle change usually immediately precedes gross visible flow especially for polymers of low melt viscosity. Observations are made at a heating rate of 14° C./min. For azomethines and in a few other cases, where rapid further polymerization occurs, a faster rate, about 50° C./min. is used.

It should be understood that the flow temperature of these (co)polymers and fibers may vary depending on their history. For example, stepwise heating ordinarily raises the flow temperature. This permits heat treatment at temperatures above the initial flow temperature but below the newly attained flow temperature level. The reported flow temperatures are those determined by these procedures.

Intensity Traces

The melt-forming (co)polymers useful for fibers in this invention are considered to form anisotropic melts according to the thermooptical test (TOT) if, as a sample is heated between crossed (90°) polarizers to temperatures above its flow temperature, the intensity of the light transmitted through the resulting anisotropic melt gives a trace whose height (1) is at least twice the height of the background transmission trace on the recorder chart and is at least 0.5 cm greater than the background transmission trace, or (2) increases to such values. Curve B of the Figure illustrates a type of intensity trace usually obtained for systems forming anisotropic melts.

The intensity of light transmitted through the analyzer when isotropic melts (the sample should be completely melted) are between crossed (90°) polarizers is essentially that of the background transmission (that obtained when the sample but not the cover slip is outside the field of view with 90° crossed polarizers). As these melts form, the intensity of the light transmission (1) is essentially that of the background transmission or (2) decreases to such values from a higher value. Curve A of the Figure illustrates an intensity trace of a polymer forming an isotropic melt.

The process of the present invention will be further described with particular reference to the following examples. In such examples the heat treatment for fibers is carried out using the following techniques, indicated in the examples of the table by the appropriate letter:

(a) A skein of yarn is suspended in an oven swept with a continuous stream of nitrogen. The oven and sample are heated through the temperature/time cycle indicated;

(b) The yarn is wound onto a perforated bobbin that has first been covered with ceramic insulating batting to provide a soft heat resistant surface that yields under low stresses, and is placed in an oven and treated as in (a);

(c) Yarn is loosely piled into a perforated metal basket, which is placed in an oven and treated as in (a), or into a glass tube which is heated through the temperature/time cycle with continuous passage of nitrogen over the filaments.

The temperature/time cycle is indicated in the Examples. Generally, the temperature is changed so rapidly that the oven and sample are at the recorded temperature for substantially the entire period indicated, but for some of the heat treatments the temperature was changed gradually over the initial 10 to 30 minutes, and then remained at the higher temperature for the rest of the indicated period. It will be noted that the oven is sometimes allowed to cool and is then reheated.

The increase in tenacity of at least 50% to at least 10 grams per denier upon heat treatment is accompanied by an increase in inherent viscosity which is indicative of increased molecular weight. The inherent viscosity of the as-spun fibers has been found to increase or the fibers have become insoluble after heat treatment.

In Examples 5, 7, 14 and 15 the inherent viscosities of the as-spun fiber increased upon heat treatment as follows:

| Ex. | As-spun Fiber | Heat Treated Fiber |
|---|---|---|
| 5 | 2.4 (Method 2) | 7.1 (Method 2) |
| 7 | 0.35 (Method 4) | 1.0 (Method 4) |
| 14 | 0.74 (Method 2) | 2.35 (Method 2) |
| 15 | 0.5 (Method 4) | 3.0 (Method 4) |

EXAMPLE 1

This example illustrates the preparation of strong fibers of poly(chloro-1,4-phenylene terephthalate/4,4'-oxydibenzoate) (7/3) useful for preparation of tire cords.

Polymer Preparation

In a 2-liter resin kettle equipped with a stirrer, nitrogen inlet port, condenser, fraction cutter, and collection flask are placed 706.5 g. (3.09 moles) of chloro-1,4-phenylene diacetate, 348.9 g (2.10 moles) of terephthalic acid and 232.4 g (0.90 mole) of 4,4'-oxydibenzoic acid. The kettle is purged with dry nitrogen and heated from 275° C. to 300° C. in 38 minutes; stirring is begun. The temperature is held at 300° C. for 111 min, increased to 325° C. over a period of 21 minutes, then held at 325° C. for 10 min. The system then is evacuated to a pressure of 1.0 mm Hg in 18 minutes and held at 1 mm for 4 min. The system is returned to atmospheric pressure, stirring is stopped, and the molten polymer is poured into an ice/water mixture; yield=798 g. Acetic acid (321 g) is collected during polymerization. The polymer is cut into small pieces, extracted with boiling acetone, and dried in vacuo at 120° C. It forms an anisotropic melt above its flow temperature of 289° C. (TOT).

Spinning

The polymer, melted in a single screw melt spinning machine with a melt zone temperature of 327° C., is spun at 328° C. into ambient air through a 34-hole spinneret with holes 0.013 cm in diameter and 0.051 cm in length, and the resultant fibers wound up at 457 m/min; SSF=50. The 34 filament yarn exhibits T/E/Mi/Den=4.7/1.1/504/103; O.A.=11° (20.4°), flow temperature=301° C.

Heat Strengthening (Part A)

The yarn is wound on a perforated stainless steel bobbin wrapped with "Fiberfrax" (batted ceramic insulation from Carborundum Co.) and is placed in an insulated oven (25° C.) that is purged continuously with a stream of nitrogen at a rate of about 60 standard ft$^3$/hr (SCFH).

After about ½ hour the oven and nitrogen (via an attached preheater) are heated to about 260° C. in 35 minutes and are held at about 260° C. for 85 minutes, then heated to 270° C. in 20 minutes, held at 270° C. for 40 minutes, then heated to 300° C. in 25 minutes and held at 300° C. for 95 minutes. The oven and nitrogen heaters are turned off and the sample allowed to cool to 25° C. over a period of 30 minutes in the nitrogen-swept oven. The treated yarn (Sample A) exhibits T/E/Mi/Den=15/2.5/528/104, O.A.=9° (20.4°), and a flow temperature of 343° C.

Heat Strengthening (Part B)

A portion of the above as-spun yarn is plied 8X and the plied yarn backwound into a perforated metal basket wherein the yarn falls into a loose, neat cylindrical package. The basket and yarn are placed in an insulated oven (25° C.) continuously purged with nitrogen (about 525 SCFH). Oven and nitrogen then are heated to 270° C. in 1 hour and are held at 274° C. for 15 hours. The oven and nitrogen heaters are turned off and the sample is allowed to cool to 25° C. inside the nitrogen-swept oven for 1½ hours. The treated yarn (Sample B) exhibits T/E/Mi/Den=17/2.8/512/851 and a flow temperature of 284° C.

EXAMPLE 2

This example illustrates the preparation of strong fibers of copoly(chloro-1,4-phenylene/dichloro-1,4-phenylene trans-1,4-cyclohexanedicarboxylate) (94/6) using the process of the invention.

Polymer Preparation

In a 1-liter resin kettle equipped with a stirrer, nitrogen inlet port, and a microscale combined distillation head-condenser, are added, under nitrogen, 184.8 g (0.81 mole) of chloro-1,4-phenylene diacetate, and 139.1 g (0.81 mole) of 1,4-cyclohexanedicarboxylic acid. (The 0.81 mole of chloro-1,4-phenylene diacetate employed was analyzed by vapor phase chromatography and found to contain 0.04 mole 2,5-dichloro-1,4-phenylene diacetate and 0.01 mole 2,3-dichloro-1,4-phenylene diacetate.) The kettle and contents then are placed in a Wood's metal bath preheated to about 290° C.; stirring is begun in about 11 minutes. After another 9 minutes collection of acetic acid is begun. In another 20 minutes the nitrogen flow rate is increased slightly; after a further 10 minutes (when about 84 ml of acetic acid have been collected), the reaction mixture is placed under reduced pressure and its temperature increased to within the range of 300°–315° C. Reduced pressure (0.8–1.0 mm. Hg) is maintained for about 40 minutes; an additional 6 ml of acetic acid are collected.

The anisotropic melt is removed and allowed to cool. There is obtained 206.5 g. of copolymer, $\eta_{inh}$=2.4 (Method 2) which forms an anisotropic melt (TOT) above its flow temperature of 299° C.

Spinning

A copolymer plug is placed in a melt spinning cell equipped with 15 screens (mesh varies from 50 to 325), plus a disc filter and copper sealing ring. The plug is melted and the anisotropic melt extruded through a 5-hole spinneret [each orifice 0.018 cm in diameter and 0.025 cm in length; the spinneret pack contains 50-mesh screens] and the resulting fibers wound up.

A yarn sample obtained at a spinneret temperature of 302° C., a melt zone temperature of 312° C., and a windup speed of 594 m/min and SSF=52 exhibits these filament tensile properties: T/E/Mi/Den=4.4/2.1/203/2.7; O.A.=13° (17.7°). For the fiber, flow temperature=304° C., $\eta_{inh}$=2.2 (Method 2).

Heat Strengthening (Part A)

A portion of the as-spun fiber is plied to about 900 denier yarn and wound on a "Fiberfrax"-wrapped perforated stainless steel bobbin which is placed in an insulated oven (25° C.) swept with nitrogen (about 480 SCFH, incoming nitrogen temperature is 25° C.). The bobbin is subjected to these successive conditions of time and temperature, the oven temperature being raised periodically as shown: 25° C. to 230° C. in 1 hr, 230° C. to 235° C. in 0.5 hr, 235° C. to 265° C. in 1.5 hr, 265° C. to 285° C. in 0.75 hr, 285° C. to 305° C. in 0.75 hr, followed by cooling. The treated yarn (Sample A) exhibits T/E/Mi/Den=20/3.3/403/944; O.A.=11° (17.8°), $\eta_{inh}$=10 (Method 2). This yarn exhibits excellent tensile properties at elevated temperatures.

Heat Strengthening (Part B)

Another polymer of the same composition is prepared essentially as shown above, and is spun at similar temperature conditions at a SSF=63 in a single screw extruder melt spinning machine equipped with a 23-hole spinneret, each hole of 0.018 cm diameter and 0.025 cm length. As-spun fiber (Sample B-1) exhibits T/E/Mi/Den=3.1/1.5/215/4.5, flow temperature of 318° C., $\eta_{inh}$=2.0 (Method 2), O.A.=10° (17.7°). The fiber is wound on a "Fiberfrax"-covered bobbin, placed in an insulated oven (150° C.) swept with heated nitrogen (100 SCFH), and heated at 0.5° C./min to 310° C., after which the sample is immediately removed from the oven. The treated fiber (Sample B-2) exhibits T/E/Mi/Den=17/3.5/369/5.1.

EXAMPLE 3

This example illustrates the preparation of strong fibers of poly(chloro-1,4-phenylene 4,4'-oxydibenzoate) by the process of this invention.

Polymer Preparation

In a 1-liter resin kettle equipped with a stirrer, nitrogen inlet port, condenser, and collection flask are placed 46.1 g (0.20 mole) of chloro-1,4-phenylene diacetate and 51.65 g (0.20 mole) of 4,4'-oxydibenzoic acid. The reaction is purged with dry nitrogen and heated by a Wood's metal bath, with stirring, from 290° C. to 326° C. in 41 minutes. The system is evacuated and heated further to 335° C. in 19 minutes, at which time the polymer solidifies. The polymer exhibits $\eta_{inh}$=0.51 (Method 2) and forms an anisotropic melt (TOT) above its flow temperature of 321° C.

Spinning

A plug of the polymer is melted in a press spinning machine at a melt zone temperature of 335° C. and spun into ambient air through a 5-hole spinneret (350° C.) having 0.018 cm diameter holes of 0.036 cm length and the resulting fibers wound up at 787 m/min.; SSF=78. The fiber exhibits filament T/E/Mi/Den=3.5/5.2/121/4.7; O.A.=16° (20.2°), $\eta_{inh}$ of 0.5 (Method 2), flow temperature=339° C.

Heat Strengthening (Part A)

Plied as-spun yarn of the above fiber on a "Fiberfrax" covered bobbin is heated to 310° C. in a stream of dry nitrogen in an oven, and held at 310° C. for 4 hours. The treated yarn exhibits T/E/Mi/Den=16/3.3/321/69, $\eta_{inh}$=1.6 (Method 2), O.A.=11° (20.0°), and a flow temperature of 332° C.

Heat Strengthening (Part B)

A sample of the as-spun fiber is wound on a "Fiberfrax"-covered bobbin and placed in an insulated oven (327° C.) continuously swept with heated dry nitrogen entering at 100 SCFH. The bobbin is kept in the oven for 9 minutes, then immediately removed. The treated fiber (Sample B) exhibits filament T/E/Mi/Den=13/5.0/204/4.1 and a flow temperature of 330° C.

Heat Strengthening (Part C)

A sample of the as-spun yarn is wound on a "Fiberfrax"-covered bobbin and placed in an insulated oven (290° C.) continuously swept with heated dry air entering at about 120 SCFH. The bobbin is kept in the oven for 3 hours, then immediately removed. The treated fiber (Sample C) exhibits filament T/E/Mi/Den=12/5.4/214/3.8 and a flow temperature of 313° C.

EXAMPLE 4

This example illustrates the preparation of strong fibers of poly(chloro-1,4-phenylene terephthalate/2,6-naphthalate) (7/3).

In a 2-liter resin kettle equipped with a Hastelloy stirrer, nitrogen inlet port, and fractionating column with variable reflux distillation head and collection flask is placed 733.9 g (3.21 moles) of chloro-1,4-phenylene diacetate, 348.9 g (2.10 moles) of terephthalic acid, and 194.6 g (0.90 mole) of 2,6-naphthalenedicarboxylic acid. The mixture is purged with dry nitrogen at 25° C. and is heated to 300° C. under nitrogen flow in a Woods metal bath. Stirring is started after 16 minutes. Distillate is collected after 30 minutes. The mixture is heated at 300° C. for a total of 129 minutes, whereupon the system is evacuated to a pressure of 380 mm Hg and the temperature is raised to 330° C. over 14 minutes. The pressure is reduced further to about 10 mm Hg in 11 minutes while slowly reducing the nitrogen flow to zero. The pressure is 2.0 mm Hg after an additional 3 minutes, 1.3 mm Hg after 3 more minutes and remains thereat for a further 4 minutes, all at 330° C. with stirring. The vacuum is released with nitrogen, stirring is stopped, and the light tan molten polymer is poured into an ice water bath. A total of 787 g of solidified polymer and 384 g of distillate are collected. The polymer is extracted in hot acetone. It forms an anisotropic melt above its TOT flow temperature of 302° C.

The polymer is melted in a single screw melting machine with a melt zone temperature of 325° C. and is spun through a 34-hole spinneret (with 0.013 cm holes of 0.051 cm length) at 325° C. into ambient air and is wound up at 320 m/min (spin stretch factor=27). The 34 filament yarn exhibits a T/E/Mi/Den of 6.6/1.8/547/193; orientation angle=21° (17.7°), $\eta_{inh}$ of 2.1 (Method 3) and a flow temperature of 316° C.

The above yarn (1143 m) is plied 3 times, coated with Alon C® fumed alumina (Cabot Corporation) and backwound onto a bobbin covered with "Fiberfrax". The bobbin is placed in an insulated oven which is purged at room temperature continuously with a stream of nitrogen at a rate of 300 SCFH. The oven (and nitrogen by an attached preheater) is heated to a temperature of 260° C. over a period of 2 hours and is held at temperatures of 260° C. to 280° C. over a period of about 2.5 hours, then is heated to 290° C. and held there for 13 hours, whereupon the oven and nitrogen heaters are turned off and the sample allowed to cool slowly to 25° C. over a period of several hours in the nitrogen-swept oven. The yarn exhibits a T/E/Mi/Den of 30/4.7/527/582 and an X-ray orientation angle of 18° (22.3°). The inherent viscosity could not be determined in the solvent used for Method 3 since the yarn polymer was insoluble therein. The heat treated fiber flow temperature is 348° C.

Examples 5–19 are presented in Table I below. The units comprising the polymer and their proportions are set forth. The fibers were heat-treated below the fiber flow temperature as evidenced by the fact that no melting and no substantial interfilament fusion took place. As-spun fiber properties, heat treatment description and final fiber properties are presented.

Listed below are the flow temperatures of polymer, as-spun and heat treated fibers for examples in Table I, as well as the maximum heating temperature employed.

| Ex. | Flow Temperatures °C. Polymer | Fiber as-spun | Fiber heat treated | Max. heating temp °C. |
|---|---|---|---|---|
| 5 | 328 | 338 | 338 | 290 |
| 6 | 226 | 323 | 347 | 300 |
| 7 | 247 | 239 | 245 | 220 |
| 8 | 263 | 266 | 292 | 280 |
| 11 | 305 | 338 | 330 | 280 |
| 12 | 306 | 301 | 288 | 270 |
| 14 | 304 | 299 | 304 | 270 |
| 15 | — | 320 | 324 | 308 |
| 17 | 339 | 343 | no flow* | 300 |
| 18 | 301 | 310 | no flow* | 300 |
| 19 | 292 | 281 | no flow* | 300 |

*to 409° C.

TABLE I

For Examples 5-19 formula repeating units are $(\!-\!O\!-\!R_1\!-\!O\!-\!)\,(\!-\!\overset{O}{\underset{\|}{C}}\!-\!R_2\!-\!\overset{O}{\underset{\|}{C}}\!-\!)$

| Ex. No. | R₁ | R₂ | As-Spun Fiber T | E | Mi | O.A. (2θ) | Heat Strengthening Conditions Package | Temp °C. (Hr.) | Heat Treated Fiber T | E | Mi |
|---|---|---|---|---|---|---|---|---|---|---|---|
| 5 | Cl-phenyl | cyclohexyl | 4.7 | 2.1 | 174 | 11° (18°) | (a) | 170 (1), 230 (1) 260 (2), 290 (¾) | 11 | 2.8 | 249 |
| 6 | CH₃-phenyl | dimethylcyclohexyl | 5.0 | 3.1 | 189 | 17° (17.7°) | (b) | 300 (4-5) | 12 | 4.7 | 248 |
| 7 | Cl₂-biphenyl / Cl-phenyl (94/6) | phenyl-O-CH₂- | 4.0 | 1.8 | 352 | 26° (19.2°) | (b) | 150 (¾), 170 (1) 220 (1¼) | 16 | 3.2 | 442 |
| 8 | Cl-phenyl | methylphenyl-cyclohexyl (90/10) | 3.2 | 2.5 | 171 | 17° (18°) | (a) | 150-160 (1½) 200-220 (1¼) 250 (2), cooled to 150 (¼) Reheated at 270-280 (1) | 13 | 11 | 101 |
| 9 | CH₃-phenyl | biphenyl dimethyl (60/40) / methylphenyl | 2.2 | 5.9 | 102 | 45° (17.1°) | (b) | 223 (8.5), 252 (11) 270 (5) | 13 | 7.5 | 239 |
| 10 | naphthyl / dimethylphenyl (70/30) | | 3.8 | 0.8 | 505 | 17° (19.2°) | (c) | 280 (1), 290 (1), 300 (1), 310 (1), | 12 (10″ yarn, 241 denier) | 2.1 | 553 |

TABLE I-continued
For Examples 5-19 formula repeating units are $+O-R_1-O+ +C-R_2-C+$ with both C's double-bonded to O.
| Ex. No. | $R_1$ | $R_2$ | As-Spun Fiber T E Mi O.A. (2θ) | Heat Strengthening Conditions Package Temp °C. (Hr.) | Heat Treated Fiber T E Mi |
|---|---|---|---|---|---|
| 11 |  (95/5) | 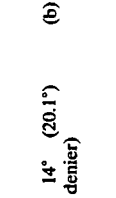 | 3.6 2.3 159 12° (17.8°) | (a) same as Ex. 8 | 13 4.2 264 |
| 12 |  | 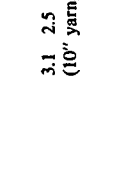 (80/20) | 3.1 2.5 200 14° (20.1°) (10″ yarn, 123 denier) | (b) 255 (1½), 270 (3) | 10 4.5 185 (5″ yarn, 124 denier) |
| 13 | 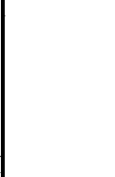 | 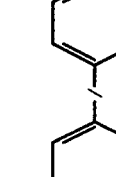 (20/80) | 3.6 1.1 392 13° (18.0°) | (a) 30–280 (2.3), 280 (4) | 10 3.3 381 |
| 14 | 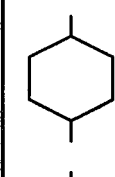 | 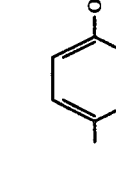 (80/20) | 2.9 7.1 100 45° (18.6°) | (b) 160 (¾), 200 (⅔), 240 (1), 270 (1) | 12 6.0 149 (10″ yarn, 102 denier) |
| 15 | 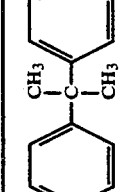 (90/10) |  | 2.5 6.6 86 55° (19.0°) (10″ yarn, 24 denier) | (b) 280 (1), 290 (1), 300 (1½), 308 (1) | 11.9 8.9 77 (10″ yarn, 591 denier) |
| 16 | 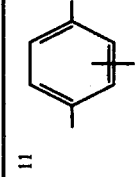 (70/30) | 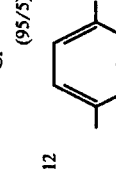 | 3.8 2.3 275 24° (18.6°) | (b) 280 (1), 290 (1) 300 (1), 310 (1) | 20 5.3 246 (10″ yarn, 192 denier) |

TABLE I-continued

For Examples 5-19 formula repeating units are $+O-R_1-O+$ $+C-R_2-C+$ (with C=O groups)

| Ex. No. | R$_1$ | R$_2$ | As-Spun Fiber T E Mi O.A. (2θ) | Heat Strengthening Conditions Package Temp °C. (Hr.) | Heat Treated Fiber T E Mi |
|---|---|---|---|---|---|
| 17 | 4-chlorophenylene / phenylene (90/10) | 4,4'-oxybis(phenylene)-phenylene (90/10) | 2.8 0.8 393 14° (20.4°) | (a) 280 (1½), 300 (3) | 17.5 3.8 432 |
| 18 | methyl-phenylene (70/30) | 2,6-naphthylene | 5.5 1.6 430 24° (19.4°) (5" yarn, 1159 denier) | (c) 295-300 (4½) | 20 4.4 355 (5" yarn, 1110 denier) |
| 19 | ethyl-phenylene (C$_2$H$_5$) (70/30) | 2,6-naphthylene | 3.2 0.8 470 25° (19.5°) 10" filaments | (c) 235 (1), 270 (1½), 280 (4), 300 (7½) | 12 3.9 366 |

Note:
Where R$_1$ or R$_2$ consists of two components to form a copolyester, the mole percentage of each component is given in parenthesis beneath the formula.

EXAMPLE 20

This example illustrates preparation and heat treatment of copoly (nitrilo-2-methyl-1,4-phenylenenitrilomethylidyne-1,4-phenylenemethylidyne/nitrilo-1,4-phenyleneethylene-1,4-phenylenenitrilomethylidyne-1,4-phenylenemethylidyne)(90/10) fiber.

To a stirred solution of 2-methyl-1,4-phenylenediamine (8.70 g, 0.072 mole) and 4,4'-ethylenedianiline (1.69 g, 0.008 mole) in a mixture of hexamethylphosphoramide (50 ml), N-methylpyrrolidone (50 ml), and lithium chloride (4 g), under nitrogen, is added terephthalaldehyde (10.72 g, 0.08 mole). 4-Aminoacetanilide (0.4 g) is added after 10 min, and the reaction mixture is stirred for about 16 hr. at room temperature. The resulting viscous solution is combined with water to precipitate the polymer which is collected, washed separately with water and with methanol in a blender, and dried in a vacuum oven at 80° C. to yield 18.4 g of copolymer as a yellow powder, $\eta_{inh}=1.4$.

A copolymer plug is melt spun into air through a 1-hole spinneret (hole diameter=0.023 cm, spinneret temperature=230° C.) and the resulting fiber wound up at 860 yd/min (786 m/min). The as-spun fiber exhibits these filament tensile properties: T/E/Mi/Den.=6.1/1.2/676/6.3. It has an $\eta_{inh}$ of 4 (at C=0.1 g/100 ml solvent) and a flow temperature of 238° C. After a fiber sample is heat treated under nitrogen at 200° C. for 7 hr. on a bobbin wrapped with Fiberfrax ®, the resulting filament exhibits T/E/Mi/Den.=18.3/2.8/740/6.3. It has a flow temperature of 234° C. and an $\eta_{inh}$ of 9.1 (at C=0.1 g/100 ml solvent).

EXAMPLE 21

This example demonstrates significant enhancement of polyazomethine fiber properties in a brief heat treatment.

In a reaction vessel equipped with a stirrer, bleed tube for nitrogen, and distilling head are combined N,N'-[(2-chloro-1,4-phenylene)methylidyne] dianiline (9.6 g, 0.03 mole) and 4,4'-ethylenedianiline (6.4 g, 0.03 mole). While the dry reactants are stirred under nitrogen, the vessel is placed in a heating bath maintained at 250° C.; the bath temperature drops to 232° C. and an orange-colored melt forms. The bath temperature is kept between 250°-263° C. for the next 20 minutes (the aniline by-product distils over and is collected), after which the reaction mixture (anisotropic melt) is allowed to cool. The resulting solid polymer is collected, ground up, washed with acetone, and dried in vacuo; yield=10.0 g, $\eta_{inh}=0.8$.

A polymer plug is melt spun into air through a 1-hole spinneret (hole diameter=0.023 cm, spinneret temperature=278° C., pack contains six 50-mesh, five 200-mesh, and one 325-mesh screens) and the resulting fiber wound up at 640 m/min. The as-spun filament exhibits these properties: T/E/Mi/Den.: 4.4/1.4/402/7.3.

A 5-filament yarn is prepared from the above fiber. Separate 8-inch lengths of yarn, each weighted with a 0.3 g weight at the lower end, are individually suspended in a nitrogen flushed atmosphere within an open top glass vessel for 20 seconds at the temperature shown below; the nitrogen atmosphere is preheated to the indicated temperature; following exposure, the yarn is kept within the glass vessel which is removed and allowed to cool to room temperature before tensile properties are measured.

| Exposure Temperature °C. | Properties of Treated Fiber | | | |
|---|---|---|---|---|
| | T | E | Mi | Den. (f) |
| 179 | 10.0 | 1.6 | 691 | 7.2 |

The polymer prepared above is poly(nitrilo-1,4-phenyleneethylene-1,4-phenylenenitrilomethylidyne-chloro-1,4-phenylenemethylidyne) of the repeating formula

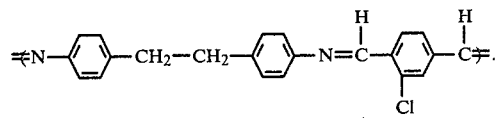

EXAMPLE 22

This example demonstrates that significant improvements in tensile properties of a polyazomethine fiber can be achieved at relatively low heat treatment temperatures.

In this treatment samples of the polyazomethine fiber of Example 21, above, are wound on Fiberfrax ®-covered metal bobbins and individually heated in an oven (nitrogen atmosphere) for 2 hours at the temperatures shown below.

| As-Spun Fibers | HEAT TREATED FIBER | | | |
|---|---|---|---|---|
| | Treatment Temperature/T/E/Mi/Den. | | | |
| T/E/Mi/Den | 100° C. | 125° C. | 150° C. | 200° C. |
| 4.1/1.4/ 402/7.3 | 8.5/1.6/ 581/7.1 | 7.3/1.6/ 469/9.4 | 9.3/1.8/ 551/7.8 | 10.0/1.8/ 577/7.1 |

What is claimed is:

1. A process for strengthening oriented fibers extruded from the melt of an optically anisotropic-melt-forming polymer and having a tenacity of at least 1 gram per denier comprising heating said fibers in an inert atmosphere while they are essentially relaxed at temperatures below the fiber flow temperature, for a period of at least about five seconds and sufficient to increase the tenacity of the fibers by at least 50% to at least 10 grams per denier.

2. The process of claim 1 wherein the fiber to be treated has a tenacity of at least 2 grams per denier.

3. The process of claim 2 wherein the polymer is a linear condensation polymer in which the radicals that are attached to the in-chain functional groups are selected from the group of (1) single and fused 6-membered carbocyclic ring systems wherein the chain-extending bonds of the ring system, if attached to the same ring, are positioned 1,4 to each other, and, if attached to different rings, are in positions parallel and oppositely directed, and (2) multiple 6-membered carbocyclic ring systems in which the chain-extending bonds of each ring are in the 1,4-positions and in which the individual rings are joined by a chemical bond or a divalent radical containing no more than 4 non-ring in-chain atoms.

4. The process of claim 3 wherein the radicals that are attached to the in-chain functional groups of the polymer are replaced in part with radicals that do not conform to groupings (1) and (2).

5. The process of claim 3 wherein the polymer is a (co)polyester consisting essentially of recurring structural units selected from the group $$\text{+O-R}_1\text{-O+} \quad \text{(I)}$$
$$\text{+OC-R}_2\text{-CO+ and} \quad \text{(II)}$$
$$\text{+O-R}_3\text{-CO+} \quad \text{(III)}$$

wherein units I and II, if present, are present in substantially equimolar amounts; $R_1$, $R_2$ and $R_3$ are radicals selected from the group of (1) single and fused six-membered aromatic carbocyclic ring systems wherein the chain-extending bonds of the ring system, if attached to the same ring, are positioned 1,4 to each other, and, if attached to different rings, are in positions parallel and oppositely directed, and (2) multiple six-membered aromatic carbocyclic ring systems in which the chain extending bonds of each ring are in the 1,4-positions and in which the individual rings are joined by a chemical bond or a divalent radical containing no more than 4 non-ring in-chain atoms; $R_2$ may also be

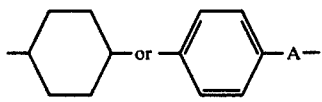

wherein A is a divalent radical containing one or two non-ring in-chain atoms.

6. The process of claim 5 wherein the polymer group (1) radicals are selected from phenylene and naphthylene and the polymer group (2) radicals are two-ring systems.

7. The process of claim 6 wherein the polymer consists essentially of units I and II.

8. The process of claim 5 wherein up to 30 mol % based on the total I, II and III units and their replacements are aromatic polymer-forming units not conforming to the formulas of I, II or III units.

9. The process of claim 5 wherein the heat treatment proceeds for a period of from ½ hour to four hours.

10. A process for strengthening oriented fibers having a tenacity of at least 1 gram per denier and formed from an optically anisotropic-melt-forming (co)polyester consisting essentially of recurring structural units selected from the group $$\text{+O-R}_1\text{-O+ and} \quad \text{(I)}$$
$$\text{+OC-R}_2\text{-CO+} \quad \text{(II)}$$

wherein units I and II are present in substantially equimolar amounts; $R_1$ and $R_2$ are radicals selected from the group of (1) single and fused six-membered aromatic carbocyclic ring systems wherein the chain-extending bonds of the ring system, if attached to the same ring, are positioned 1,4 to each other, and, if attached to different rings, are in positions parallel and oppositely directed, and (2) multiple six-membered aromatic carbocyclic ring systems in which the chain-extending bonds of each ring are in the 1,4-positions and in which the individual rings are joined by a chemical bond or a divalent radical containing no more than 4 non-ring in-chain atoms; $R_2$ may also be

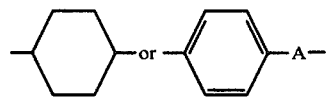

wherein A is a divalent radical containing one or two non-ring in-chain atoms, which comprises heating said fibers while they are essentially relaxed, in an inert atmosphere and for a period of time sufficient to increase the tenacity of the fibers by at least 50% to at least 10 grams per denier.

11. The process of claim 10 wherein at least part of the heat-treatment is carried out at temperatures of at least 200° C. but below the fiber flow temperature for a period of from 1 minute to several hours.

12. The process of claim 10 wherein the fiber to be heat treated has a tenacity of at least 2 grams per denier.

* * * * *